United States Patent
Hirabayashi

(10) Patent No.: US 11,899,340 B2
(45) Date of Patent: Feb. 13, 2024

(54) CAMERA

(71) Applicant: NIDEC COPAL CORPORATION, Tokyo (JP)

(72) Inventor: Koichi Hirabayashi, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/968,796

(22) Filed: Oct. 19, 2022

(65) Prior Publication Data

US 2023/0121605 A1 Apr. 20, 2023

(30) Foreign Application Priority Data

Oct. 20, 2021 (JP) .................. 2021-171355

(51) Int. Cl.
| | |
|---|---|
| G03B 17/04 | (2021.01) |
| G03B 5/00 | (2021.01) |
| G03B 17/12 | (2021.01) |

(52) U.S. Cl.
CPC ............... *G03B 17/04* (2013.01); *G03B 5/00* (2013.01); *G03B 17/12* (2013.01)

(58) Field of Classification Search
None
See application file for complete search history.

(56) References Cited

U.S. PATENT DOCUMENTS

| | | | | | |
|---|---|---|---|---|---|
| 2007/0002469 | A1* | 1/2007 | Matsugae | ................ | G03B 5/00 359/811 |
| 2013/0194680 | A1* | 8/2013 | Kobayashi | ............... | G02B 7/08 359/700 |
| 2014/0376104 | A1* | 12/2014 | Fujinaka | .................. | G02B 7/10 359/700 |
| 2019/0162926 | A1* | 5/2019 | Sasaki | ....................... | G02B 7/10 |
| 2020/0117074 | A1* | 4/2020 | Fujinaka | ................ | G03B 17/14 |
| 2021/0063678 | A1* | 3/2021 | Kato | .................... | G02B 27/646 |
| 2023/0129149 | A1* | 4/2023 | Hirabayashi | ........... | G03B 17/04 396/448 |
| 2023/0130292 | A1* | 4/2023 | Hirabayashi | ........... | G03B 17/04 396/529 |
| 2023/0185166 | A1* | 6/2023 | Muramatsu | ............ | G03B 17/04 396/448 |

FOREIGN PATENT DOCUMENTS

JP 201928295 A 2/2019

* cited by examiner

*Primary Examiner* — Clayton E. LaBalle
*Assistant Examiner* — Diana Hancock
(74) *Attorney, Agent, or Firm* — HAUPTMAN HAM, LLP

(57) ABSTRACT

A camera blocks light outside a lens barrel entering an optical path in a lens barrel. A camera includes a frame and a lens barrel accommodating a lens. The lens barrel includes a stationary cylinder including a cylindrical wall having a through-cam groove extending with its circumferential position changing in X-direction, a drive cylinder rotatable relative to the stationary cylinder without moving in X-direction, a rotary cylinder rotatable relative to the stationary cylinder and movable in X-direction, a key cylinder movable in X-direction together with the rotary cylinder, a linearly movable cylinder rotatable relative to the rotary cylinder together with the key cylinder. The camera further includes a connecting frame attached to a rear end of the key cylinder in the lens barrel and a rear light shield including a bellows connecting the connecting frame and the frame in an expandable manner.

6 Claims, 12 Drawing Sheets

CAMERA

RELATED APPLICATIONS

The present application claims priority to Japanese Application Number 2021-171355, filed Oct. 20, 2021, the disclosure of which is hereby incorporated by reference herein in its entirety.

BACKGROUND

Technical Field

The present invention relates to a camera, and particularly, to a camera including a lens barrel that is extendable in an optical axis direction.

Description of the Background

A known camera includes a lens barrel that allows one or more cylinders to extend and retract in an optical axis direction when an operation ring is rotated (refer to, for example, Patent Literature 1). For such a lens barrel including the operation ring, to block light outside the lens barrel (e.g., sunlight, strobe light, and light from light-emitting diodes or LEDs in the camera) entering into an exposed portion of the camera, a light-shielding ring or a light-shielding felt piece is to be used to cover a gap between the cylinders. Recent cameras include more cylinders for photographing at multiple positions and include more light-shielding rings or light-shielding felt pieces accordingly. This increases the manufacturing cost. The cameras are thus to have a less expensive structure that blocks light entering through the lens barrel.

CITATION LIST

Patent Literature

Patent Literature 1: Japanese Unexamined Patent Application Publication No. 2019-28295

BRIEF SUMMARY

In response to the above issue, one or more aspects of the present invention are directed to a camera that blocks light outside a lens barrel entering an optical path in the lens barrel.

A camera according to one aspect of the present invention blocks light outside a lens barrel entering an optical path in the lens barrel. The camera includes a housing having a front surface with an opening, a frame accommodated in the housing, and a lens barrel accommodating at least one lens. The lens barrel includes a stationary cylinder including a base fastened to the frame and a cylindrical wall having a through-cane groove extending with a circumferential position of the through-cam groove changing in an axial direction, a drive cylinder that drives the lens barrel to extend and retract, a rotary cylinder rotatable relative to the stationary cylinder and movable in the axial direction, a key cylinder movable in the axial direction together with the rotary cylinder without rotating relative to the stationary cylinder, and a linearly movable cylinder rotatable relative to the rotary cylinder together with the key cylinder. The drive cylinder is rotatable relative to the stationary cylinder without moving in the axial direction. The camera includes a connecting frame attached to a rear end of the key cylinder in the lens barrel and a first light shield including a first bellows connecting the connecting frame and the frame in an expandable manner. The rotary cylinder includes a first cylindrical portion located radially inward from the cylindrical wall of the stationary cylinder, and a first actuation portion protruding radially outward from the first cylindrical portion and engaged with the through-cam groove in the stationary cylinder. The drive cylinder includes a second cylindrical portion located radially outward from the cylindrical wall of the stationary cylinder. The second cylindrical portion has a first axial groove extending in the axial direction and engaged with the first actuation portion of the rotary cylinder protruding radially outward through the through-cam groove in the stationary cylinder. The first cylindrical portion of the rotary cylinder has, on an inner circumferential surface of the first cylindrical portion, a first cam groove extending with a circumferential position of the first cam groove changing in the axial direction. The key cylinder includes a third cylindrical portion located radially inward from the first cylindrical portion of the rotary cylinder. The third cylindrical portion has a second axial groove extending in the axial direction. The linearly movable, cylinder includes a fourth cylindrical portion located radially inward from the first cylindrical portion of the rotary cylinder, and a second actuation portion protruding radially outward from the fourth cylindrical portion and engaged with the first cam groove on the rotary cylinder through the third cylindrical portion of the key cylinder.

DETAILED DESCRIPTION

Figure 1:
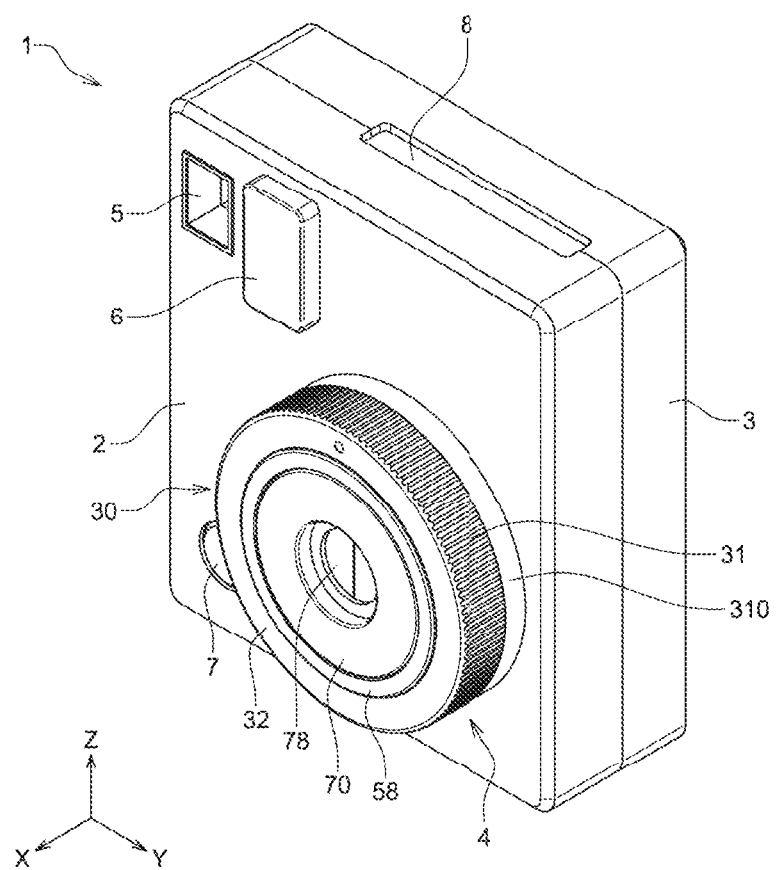
FIG. 1 is a perspective view of a camera according to one embodiment of the present invention.

A camera according to one or more embodiments of the present invention will now be described in detail with reference to FIGS. 1 to 12. In FIGS. 1 to 12, like reference numerals denote like or corresponding components. Such components will not be described repeatedly. In FIGS. 1 to 12, the scale and dimensions of each component may be exaggerated, or one or more components may not be shown. Unless otherwise specified, the terms such as first and second will be used simply to distinguish the components and will not represent a specific order or sequence.

FIG. 1 is a perspective view of a camera 1 according to one embodiment of the present invention. Although the camera 1 according to the present embodiment is a camera (instant camera) that uses a photographic film to be automatically developed after shooting, the present invention is also applicable to a camera other than such an instant camera. For ease of explanation in the present embodiment, the term front or frontward refers to the positive X-direction in FIG. 1, and the term rear or rearward refers to the negative X-direction in FIG. 1.

As shown in FIG. 1, the camera 1 includes a front cover 2, a rear cover 3 attached to the rear of the front cover 2, and a lens barrel 4 accommodating a lens unit. The front cover 2 includes a viewfinder 5. A flash window 6 is located adjacent to the viewfinder 5. A release button 7 is located in the negative Z-direction from the viewfinder 5. The front cover 2 and the rear cover 3 have, in their upper portions, an ejection slit 8 extending in Y-direction across the front cover 2 and the rear cover 3. A photographic film developed after shooting is ejected from the ejection slit 8.

Figure 2:
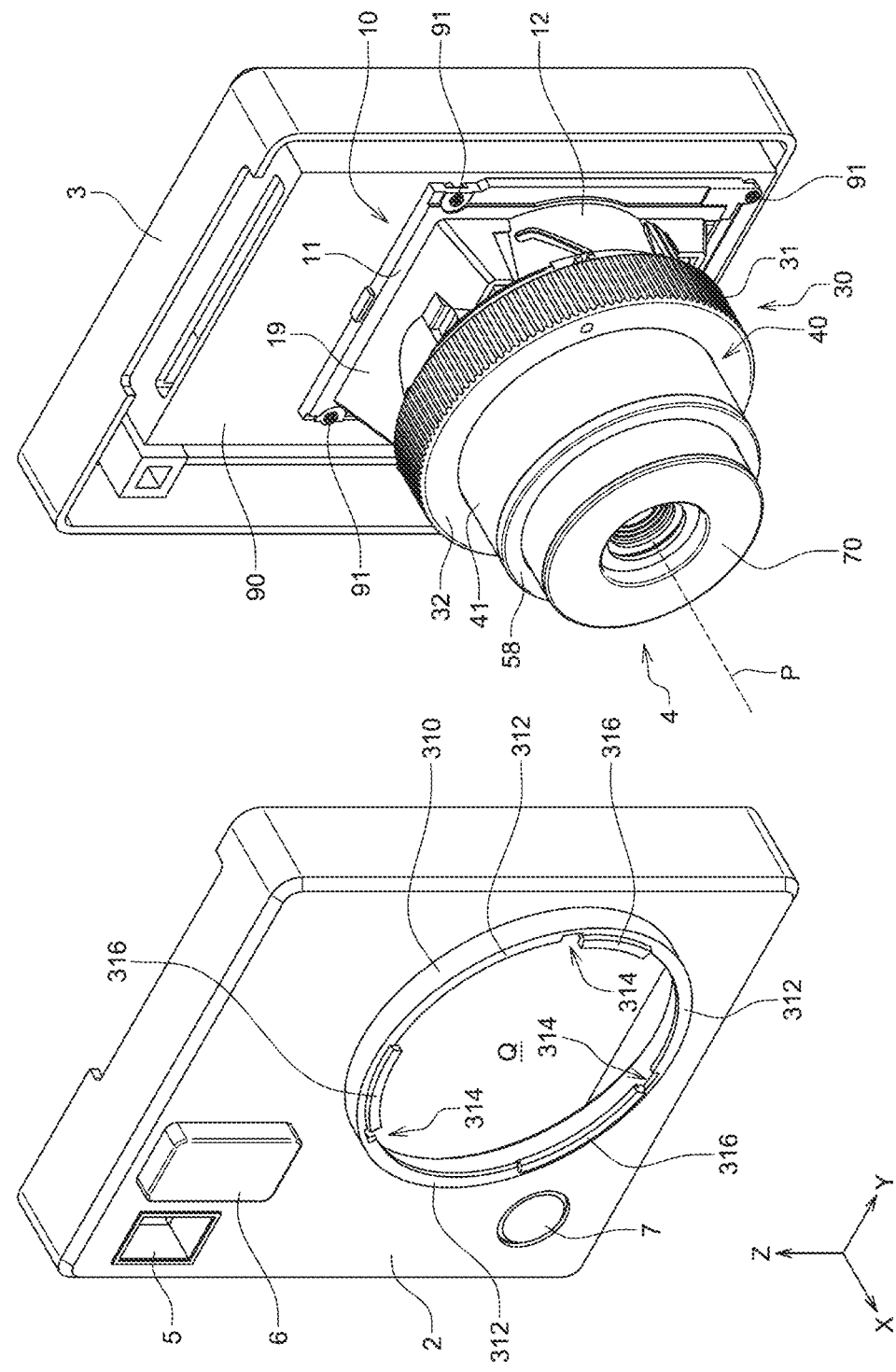
FIG. 2 is a perspective view of the camera in FIG. 1 with a lens barrel extending frontward and a front cover being removed.

The lens barrel 4 in the present embodiments extendable in an optical axis direction. The lens barrel 4 shown in FIG. 1 is retracted furthest in the optical axis direction (X-direction). The state of the camera 1 with the lens barrel 4 in the state shown in FIG. 1 is referred to as a retracted state of the camera 1. FIG. 2 shows the lens barrel 4 extending to its maximum length in a direction (X-direction) along an optical axis P and the front cover 2 being removed. The state of the camera 1 with the lens barrel 4 in the state shown in FIG. 2 is referred to as a most extended state of the camera 1.

As shown in FIG. 2, the front cover 2 has a substantially circular opening Q in its front surface. A part of the lens barrel 4 extends and retracts along the optical axis P in front of the front cover 2 through the opening Q. The front cover 2 and the rear cover 3 form a housing that accommodates a substantially rectangular frame 90. The frame 90 contains, for example, a photographic film. The lens barrel 4 is attached to the frame 90.

Figure 3:
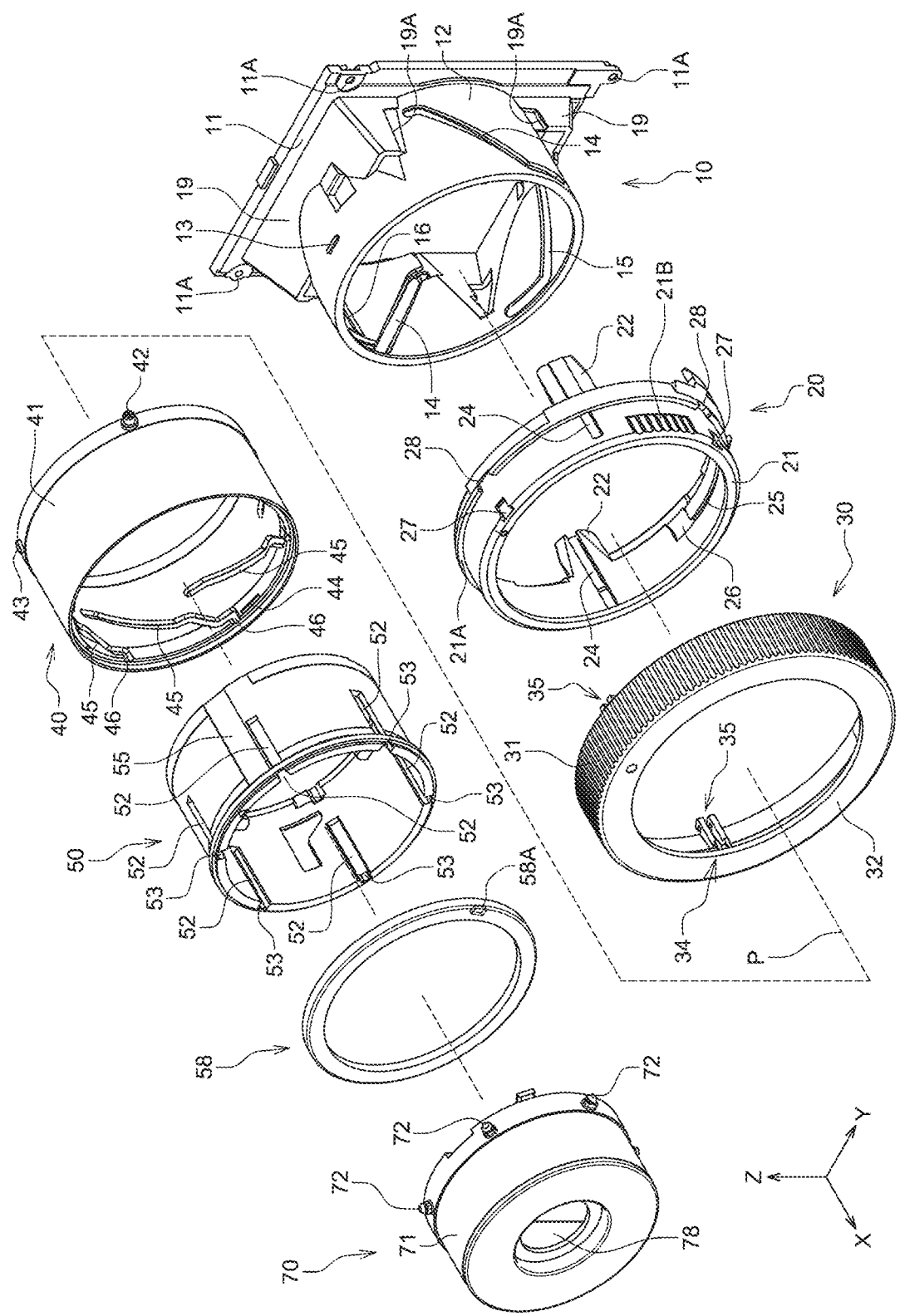
FIG. 3 is an exploded perspective view of the lens barrel in the camera in FIG. 1.

FIG. 3 is an exploded perspective view of the lens barrel 4 in the camera 1 in FIG. 1. As shown in FIG. 3, the lens barrel 4 in the present embodiment includes a stationary cylinder 10, a drive cylinder 20 (operation ring), a cover cylinder 30, a rotary cylinder 40, a key cylinder 50, a cover ring 58, and a linearly movable cylinder 70. The stationary cylinder 10 is attached to the front surface of the frame 90. The drive cylinder 20 is rotatable relative to the stationary cylinder 10 without moving in an axial direction. The cover cylinder 30 covers the outer circumference of the drive cylinder 20. The rotary cylinder 40 is rotatable relative to the stationary cylinder 10 and movable in the axial direction. The key cylinder 50 is movable in the axial direction together with the rotary cylinder 40 without rotating relative to the stationary cylinder 10. The cover ring 58 is attached to the front edge of the key cylinder 50, The linearly movable cylinder 70 is rotatable relative to the stationary cylinder 10 together with the key cylinder 50. In the present embodiment, the linearly movable cylinder 70 accommodates the lens unit including at least one lens (not shown). A barrier 78 that can be open and closed is located in front of the lens unit in the linearly movable cylinder 70. In the present embodiment, the rotary cylinder 40, the key cylinder 50, the cover ring 58, and the linearly movable cylinder 70 are included in an extendable unit that is extendable in the axial direction (X-direction) through the opening Q in the front cover 2.

Figure 4:
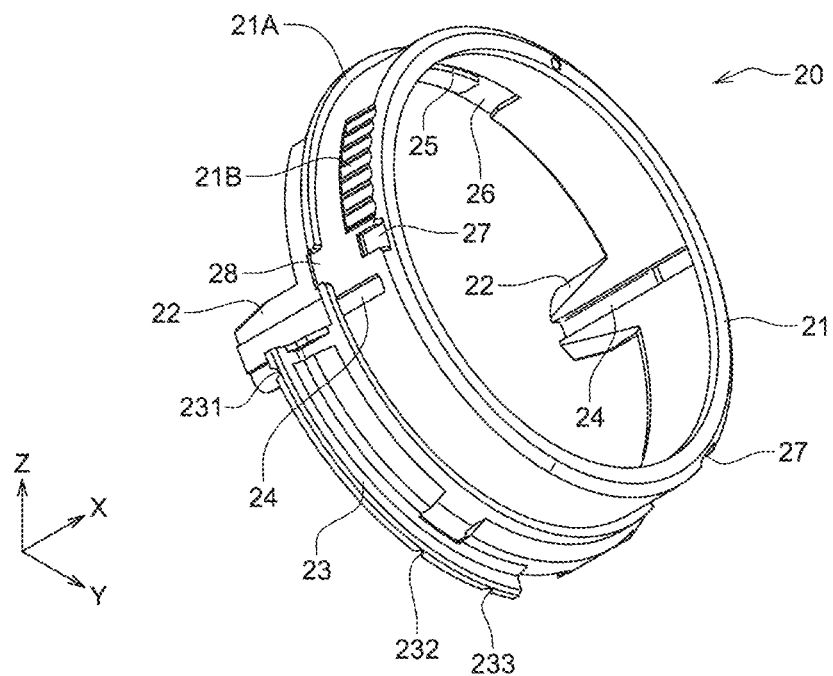
FIG. 4 is a perspective view of a drive cylinder in the lens barrel in the camera in FIG. 1.

FIG. 4 is a perspective view of the drive cylinder 20. As shown in FIGS. 3 and 4, the drive cylinder 20 includes a cylindrical portion 21 (second cylindrical portion) extending in the axial direction (X-direction), two extending portions 22 extending rearward from the cylindrical portion 21, and an arc-shaped piece 23 extending radially outward from the rear end of the cylindrical portion 21. The cylindrical portion 21 is located radially outward from the stationary cylinder 10. The cylindrical portion 21 includes, near its rear end, a flange 21A protruding radially outward. The cylindrical portion 21 has an outer circumferential surface with a knurled portion 21B to facilitate handling during assembly. The two extending portions 22 face each other across the optical axis P. The arc-shaped piece 23 has, on its rear surface, recesses 231, 232, and 233 at three circumferential positions that correspond to different extended states of the lens barrel 4.

The extending portions 22 and the cylindrical portion 21 have, on their inner circumferential surfaces, axial grooves 24 (first axial grooves) extending in the axial direction (X-direction). The cylindrical portion 21 has, on its inner circumferential surface, two circumferential grooves 25 extending in a circumferential direction and two connecting grooves 26 extending in the positive X-direction from the rear edge of the cylindrical portion 21 and connecting to the ends of the corresponding circumferential grooves 25. The two axial grooves 24, the two circumferential grooves 25, and the two connecting grooves 26 are all located at intervals of 180 degrees in the circumferential direction.

The cylindrical portion 21 has three recesses 27 on its front edge and a cutout 28 in a part of the flange 21A in the negative X-direction from each recess 27. The recesses 27 and the cutouts 28 are located at intervals of 120 degrees in the circumferential direction.

Figure 5A:
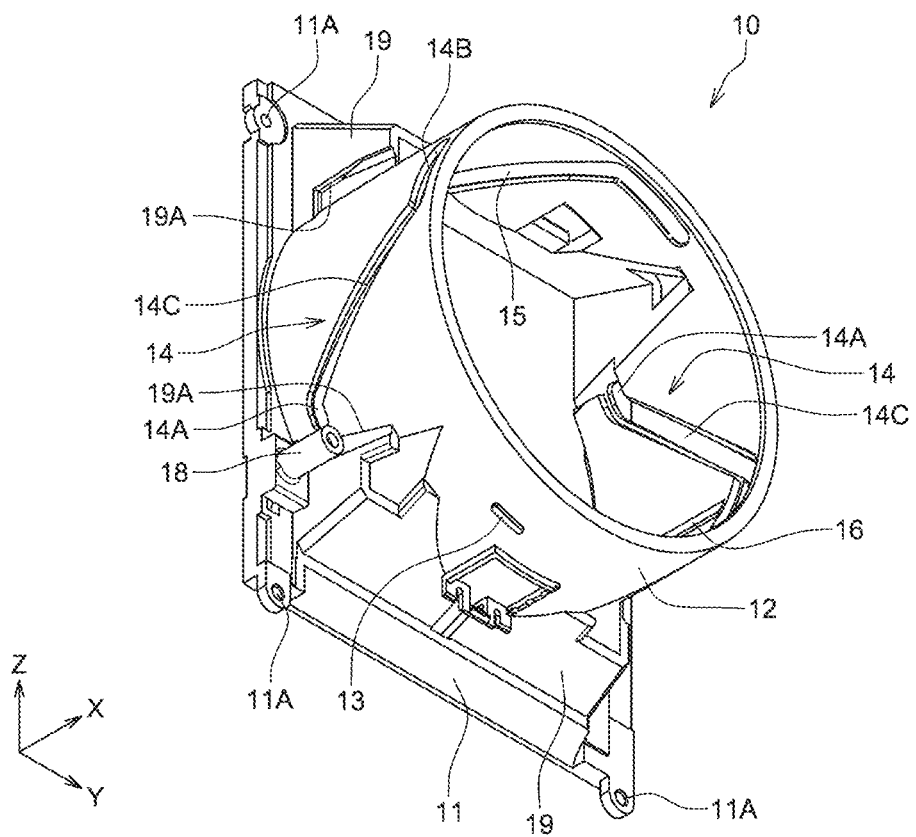
FIG. 5A is a perspective view of a stationary cylinder in the lens barrel in the camera in FIG. 1.
Figure 5B:
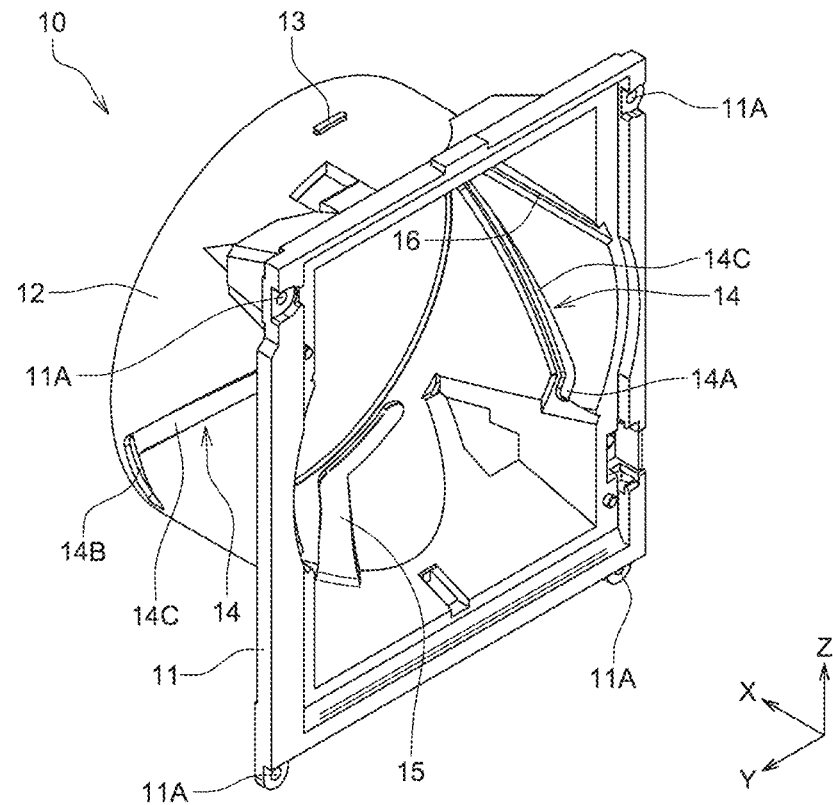
FIG. 5B is a perspective view of the stationary cylinder in the lens barrel in the camera in FIG. 1.

FIGS. 5A and 5B are perspective views of the stationary cylinder 10. As shown in FIGS. 2, 5A, and 5B, the stationary cylinder 10 includes a base 11 being a rectangular frame fastened to the frame 90, a cylindrical wall 12 extending frontward the positive X-direction) from the base 11, and two engagement tabs 13 protruding radially outward from the cylindrical wall 12. The base 11 in the stationary cylinder 10 includes a cylindrical pin holder 18 holding a pin (not shown) in contact with the rear surface of the arc-shaped piece 23 in the drive cylinder 20 described above. The base 11 has threaded holes 11A in its four corners. The threaded holes 11A receive screws 91 (refer to FIG. 2). The screws 91 are screwed into the frame 90 to fasten the stationary cylinder 10 to the frame 90.

Each engagement tab 13 on the stationary cylinder 10 has a width in the axial direction (X-direction) (hereafter referred to as an axial width) slightly smaller than the axial width of the corresponding circumferential groove 25 on the drive cylinder 20. The engagement tabs 13 on the stationary cylinder 10 are thus engaged with the corresponding circumferential grooves 25 on the drive cylinder 20 and movable in the circumferential direction inside the circumferential grooves 25. The drive cylinder 20 with its circumferential grooves 25 engaged with the corresponding engagement tabs 13 on the stationary cylinder 10 can thus rotate relative to the stationary cylinder 10 without changing its axial position relative to the stationary cylinder 10.

Each engagement tab 13 on the stationary cylinder 10 has a width in the circumferential direction (hereafter referred to as a circumferential width) smaller than the circumferential width of the corresponding connecting groove 26 on the drive cylinder 20. To join the drive cylinder 20 to the stationary cylinder 10, the drive cylinder 20 is moved in the negative X-direction from the front of the stationary cylinder 10 with the engagement tabs 13 on the stationary cylinder 10 aligned with the corresponding connecting grooves 26 on the drive cylinder 20 in the circumferential direction. This allows the engagement tabs 13 on the stationary cylinder 10 to move in the axial direction (X-direction) inside the corresponding connecting grooves 26 on the drive cylinder 20 to the ends of the circumferential grooves 25. The drive cylinder 20 in this state is then rotated relative to the stationary cylinder 10. This allows the engagement, tabs 13 on the stationary cylinder 10 to be engaged with the corresponding circumferential grooves 25 on the drive cylinder 20.

As shown in FIGS. 2, 5A, and 5B, the cylindrical wall 12 of the stationary cylinder 10 has two through-cam grooves 14 extending through the cylindrical wall 12. The two through-cam grooves 14 are located at intervals of 180 degrees in the circumferential direction. Each through-cam groove 14 includes a rear end 14A extending in the circumferential direction, a front end 14B extending in the circumferential direction, and an intermediate portion 14C connecting the rear end 14A and the front end 14B. The intermediate portion 14C of the through-cam groove 14 extends with its circumferential position gradually changing from the rear end 14A toward the front end 14B.

The cylindrical wall 12 of the stationary cylinder 10 has, on its inner circumferential surface, two cam grooves 15 (second cam grooves) extending in shapes corresponding to the through-cam grooves 14 described above and two axial grooves 16 (third axial grooves) extending in the axial direction (X-direction). In the present embodiment, the cam grooves 15 are at the positions rotated by 90 degrees about an axis relative to the through-cam grooves 14.

Referring back to FIG. 2, the opening Q in the front cover 2 is inside a cylindrical portion 310 extending in X-direction. The cylindrical portion 310 has a front edge including a flange 312 extending radially inward. The flange 312 partly has cutouts 314. Restrictors 316 protruding frontward from the flange 312 and extending radially inward are adjacent to the corresponding cutouts 314. The restrictors 316 are in contact with the front surface of the flange 21A in the drive cylinder 20 to restrict axial movement of the drive cylinder 20.

Figure 6:
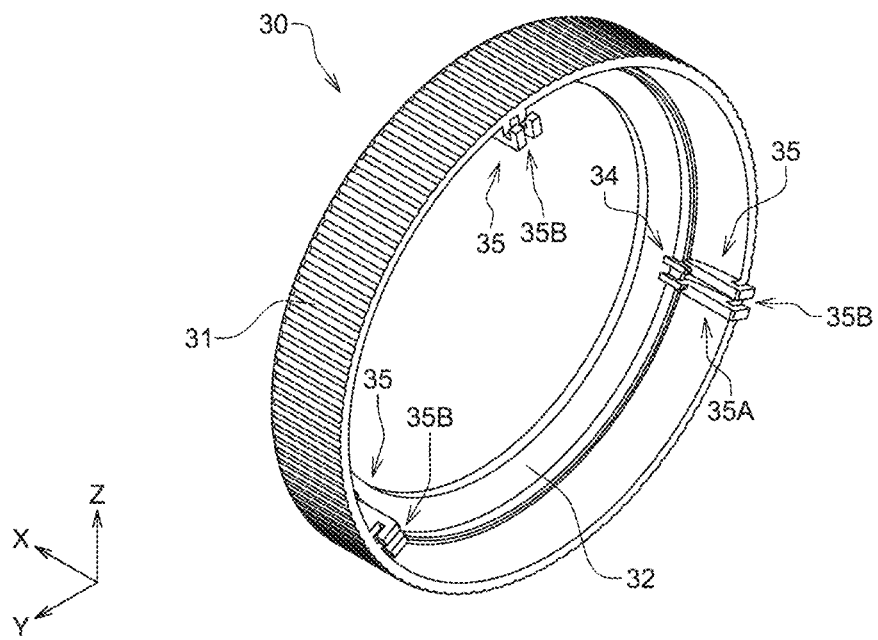
FIG. 6 is a perspective view of a cover cylinder in the lens barrel in the camera in FIG. 1.

FIG. 6 is a perspective view of the cover cylinder 30. The cover cylinder 30 is rotatable relative to the stationary cylinder 10 together with the drive cylinder 20 described above. As shown in FIG. 6, the cover cylinder 30 includes a cylindrical portion 31 extending in the axial direction (X-direction), an annular portion 32 extending radially inward from the front end of the cylindrical portion 31, three engagement members 34 on the inner circumferential surface of the cylindrical portion 31, and three hooks 35 each located behind the corresponding one of the three engagement members 34. The cylindrical portion 31 has an uneven outer circumferential surface for easy operation by a user. When the cover cylinder 30 formed from, for example, resin includes the engagement members 34 and the hooks 35 at various positions, the outer shape of the cover cylinder 30 may deform easily. Thus, in the present embodiment, the three engagement members 34 and the three hooks 35 are aligned with each other in the circumferential direction and located at intervals of 120 degrees in the circumferential direction.

Each engagement member 34 has a recess on its middle portion in the circumferential direction. Each hook 35 also has a recess on its middle portion in the circumferential direction. Each hook 35 includes a beam 35A extending in the negative. X-direction from the corresponding engagement member 34 and an engagement tab 35B extending radially outward from the rear end of the beam 35A and being apart from the rear end of the cylindrical portion 31. The axial distance between the engagement tabs 35B in the hooks 35 and the rear end of the cylindrical portion 31 is slightly greater than the axial width of the flange 312 on the front cover 2 described above. The engagement tab 35B in each hook 35 can thus be engaged with the flange 312 on the front cover 2. This allows the cover cylinder 30 to be attached to the front cover 2 in a rotatable manner.

The engagement members 34 in the cover cylinder 30 have substantially the same circumferential width as the recesses 27 on the drive cylinder 20. Each engagement member 34 fits in (is engaged with) the corresponding recess 27 on the drive cylinder 20 in the circumferential direction. The engagement tab 35B in each hook 35 has substantially the same circumferential width as the corresponding cutout 28 in the drive cylinder 20 and fits in the cutout 28 in the drive cylinder 20. This causes the cover cylinder 30 and the drive cylinder 20 to be integral with each other.

Each cutout 314 in the flange 312 on the front cover 2 has a circumferential width greater than the circumferential width of the corresponding hook 35. To join the cover cylinder 30 and the drive cylinder 20 to the front cover 2, the cover cylinder 30 and the drive cylinder 20 integral with each other are moved in the negative fit-direction from the front of the front cover 2 with the hooks 35 in the cover cylinder 30 aligned with the corresponding cutouts 314 in the front cover 2 in the circumferential direction. This allows the engagement tabs 35B in the hooks 35 in the cover cylinder 30 to fit in the corresponding cutouts 314 in the flange 312 on the front cover 2. The cover cylinder 30 and the drive cylinder 20 integral with each other are then rotated (counterclockwise in FIG. 2) relative to the front cover 2. This allows the engagement tabs 35B in the hooks 35 in the cover cylinder 30 to be engaged with the flange 312 on the front cover 2.

Figure 7:
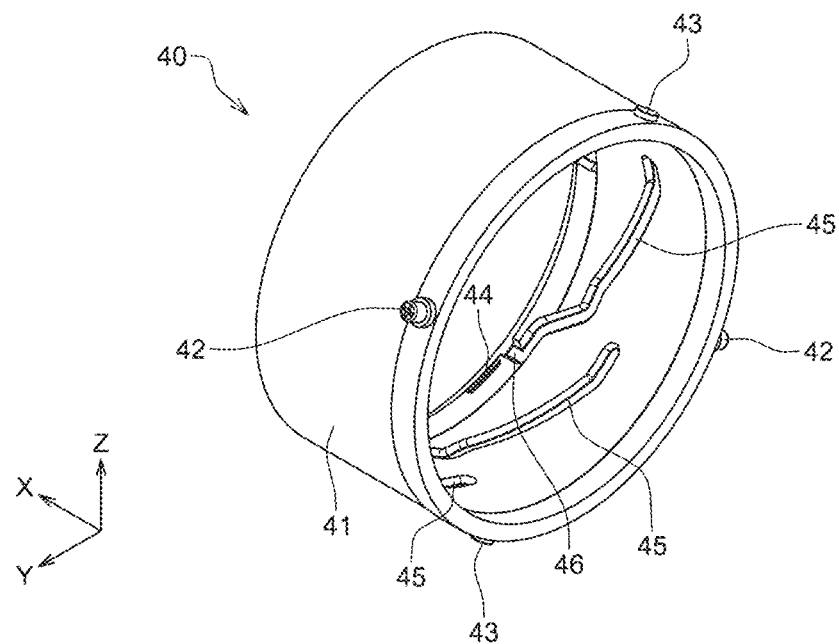
FIG. 7 is a perspective view of a rotary cylinder in the lens barrel in the camera in FIG. 1.

FIG. 7 is a perspective view of the rotary cylinder 40. The rotary cylinder 40 is rotatable relative to the stationary cylinder 10 and movable in the axial direction. As shown in FIGS. 2 and 7, the rotary cylinder 40 includes a cylindrical portion 41 (first cylindrical portion) extending in the axial direction (X-direction) and located radially inward from the stationary cylinder 10, two actuation portions 42 (first actuation portions) protruding radially outward near the rear end of the cylindrical portion 41, two protrusions 43 protruding radially outward near the rear end of the cylindrical portion 41, and three engagement tabs 44 protruding radially inward from the inner circumferential surface of the cylindrical portion 41.

The actuation portions 42 protrude more radially outward than the protrusions 43. For example, the actuation portions 42 may be screws received in bosses located near the rear end of the cylindrical portion 41. In the present embodiment, the actuation portions 42 and the protrusions 43 are alternately located every 90 degrees in the circumferential direction. The three engagement tabs 44 are located at intervals of 120 degrees about the axis.

Each actuation portion 42 has an outer diameter slightly smaller than the axial widths of the rear end 14A and the front end 14B of the corresponding through-cam groove 14 in the stationary cylinder 10, the circumferential width of the intermediate portion 14C of the corresponding through-cam groove 14, and the circumferential width of the corresponding axial groove 24 on the drive cylinder 20. Each actuation portion 42 is thus engaged with the corresponding axial groove 24 on the drive cylinder 20 through the corresponding through-cam groove 14 in the stationary cylinder 10. Each protrusion 43 has an outer diameter smaller than the circumferential width of the corresponding cam groove 15 on the stationary cylinder 10 and is thus movable inside the cam groove 15 on the stationary cylinder 10.

In this structure, the actuation portions 42 of the rotary cylinder 40 are movable inside and along the corresponding through-cam grooves 14 in the stationary cylinder 10 while being engaged with the through-cam grooves 14 in the stationary cylinder 10 and also movable in the axial direction inside the corresponding axial grooves 24 on the drive cylinder 20 while being engaged with the axial grooves 24 on the drive cylinder 20. When the drive cylinder 20 rotates relative to the stationary cylinder 10, the rotary cylinder 40 with its actuation portions 42 engaged with the corresponding axial grooves 24 on the drive cylinder 20 rotates relative to the stationary cylinder 10 together with the drive cylinder 20. The rotary cylinder 40 with its actuation portions 42 engaged with the corresponding through-cam grooves 14 in the stationary cylinder 10 also moves in X-direction relative to the stationary cylinder 10 along the shape of the through-cam grooves 14 (intermediate portions 14C) as the rotary cylinder 40 rotates. In this manner, when the drive cylinder 20 rotates relative to the stationary cylinder 10, the rotary cylinder 40 rotates relative to the stationary cylinder 10 and also extends in the positive X-direction. As the actuation portions 42 of the rotary cylinder 40 move along the corresponding through-cam grooves 14 in the stationary cylinder 10, the protrusions 43 on the rotary cylinder 40 move in the corresponding cam grooves 15 on the stationary cylinder 10. The protrusions 43 on the rotary cylinder 40 and the cam grooves 15 on the stationary cylinder 10 engaged with each other supplementarily support the rotary cylinder 40 inside the stationary cylinder 10.

As shown in FIGS. 3 and 7, the cylindrical portion 41 of the rotary cylinder 40 has, on its inner circumferential surface, six cam grooves 45 (first cam grooves) and six connecting grooves 46 (first connecting grooves). The cam grooves 45 extend with their circumferential positions gradually changing from their rear ends toward their front ends. The connecting grooves 46 extend in the negative X-direction from the front edge of the rotary cylinder 40 and connect to the front ends of the corresponding cam grooves 45. The six cam grooves 45 and the six connecting grooves 46 are located at intervals of 60 degrees about the axis.

Figure 8:
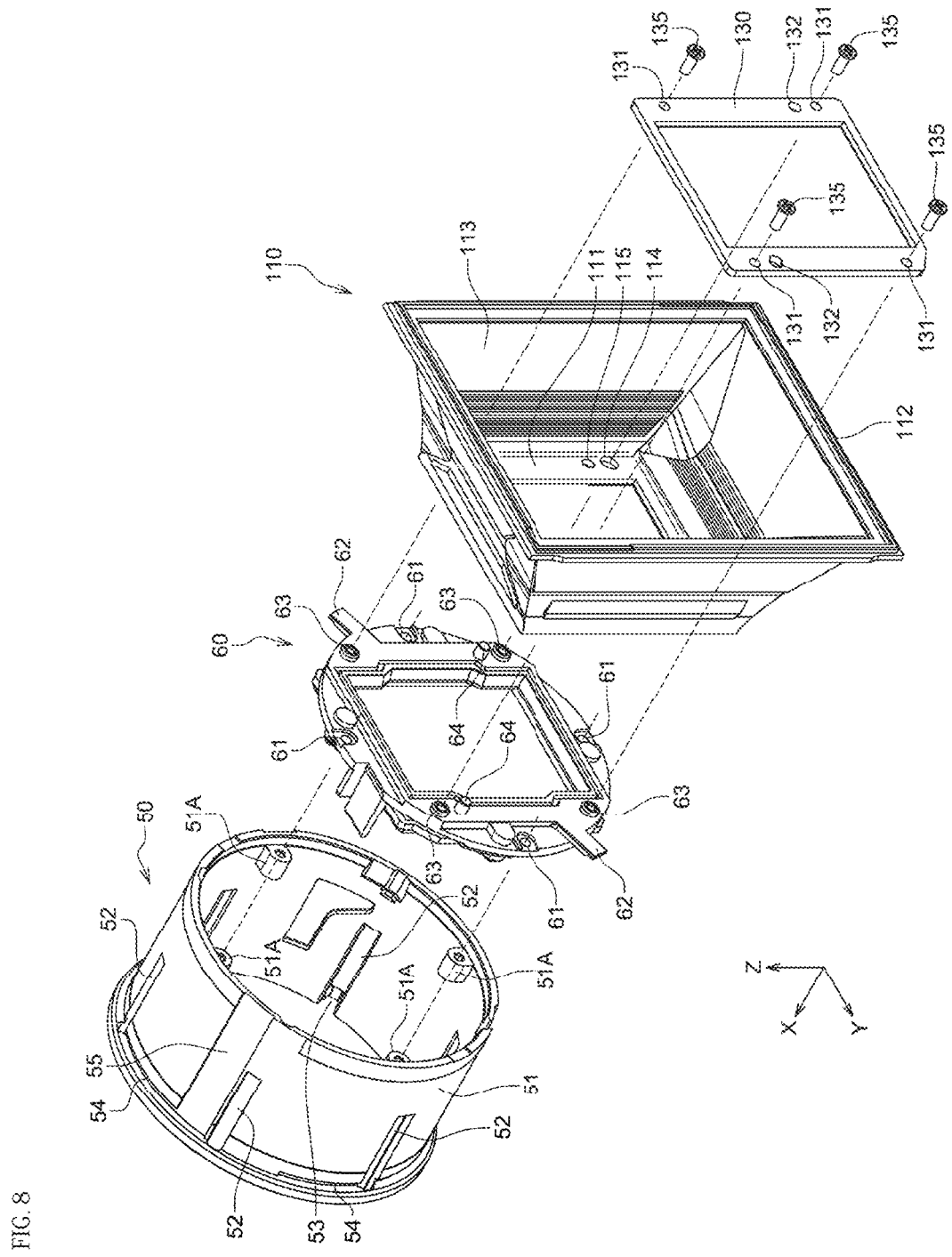
FIG. 8 is an exploded perspective view of a key cylinder in the lens barrel in the camera in FIG. 1, also showing a connecting frame and a rear light shield attached to the rear end of the key cylinder.

FIG. 8 is an exploded perspective view of the key cylinder 50, also showing a connecting frame 60 and a rear light shield 110 attached to the rear end of the key cylinder 50. As shown in FIGS. 3 and 8, the key cylinder 50 includes a cylindrical portion 51 (third cylindrical portion) extending in the axial direction (X-direction). The cylindrical portion 51 of the key cylinder 50 is located radially inward from the cylindrical portion 41 of the rotary cylinder 40.

The cylindrical portion 51 of the key cylinder 50 has six axial grooves 52 (second axial grooves) extending in the axial direction (X-direction) through the cylindrical portion 51 and six connecting grooves 53 (second connecting grooves) extending in the negative X-direction from the front edge of the cylindrical portion 51 and connecting to the ends of the corresponding axial grooves 52. The six axial grooves 52 and the six connecting grooves 53 are all located at intervals of 60 degrees in the circumferential direction.

The cylindrical portion 51 of the key cylinder 50 has, on its outer circumferential surface, three circumferential grooves 54 extending in the circumferential direction near the front edge of the cylindrical portion 51 and three connecting grooves 55 extending in the positive X-direction from the rear edge of the cylindrical portion 51 and connecting to the ends of the corresponding circumferential grooves 54. The three connecting grooves 55 and the three circumferential grooves 54 are all located at intervals of 120 degrees in the circumferential direction.

Each circumferential groove 54 on the key cylinder 50 has an axial width slightly greater than the axial width of the corresponding engagement tab 44 on the rotary cylinder 40. The engagement tabs 44 on the rotary cylinder 40 are thus engaged with the corresponding circumferential grooves 54 on the key cylinder 50 and movable in the circumferential direction inside the corresponding circumferential grooves 54. The key cylinder 50 with its circumferential grooves 54 engaged with the corresponding engagement tabs 44 on the rotary cylinder 40 can thus rotate relative to the rotary cylinder 40 without changing its axial position relative to the rotary cylinder 40.

Each connecting groove 55 on the key cylinder 50 has a circumferential width greater than the circumferential width of the corresponding engagement tab 44 on the rotary cylinder 40. To join the key cylinder 50 to the rotary cylinder 40, the key cylinder 50 is moved in the negative X-direction from the front of the rotary cylinder 40 with the engagement tabs 44 on the rotary cylinder 40 aligned with the corresponding connecting grooves 55 on the key cylinder 50 in the circumferential direction. This allows the engagement tabs 44 on the rotary cylinder 40 to move in the axial direction (X-direction) inside the corresponding connecting grooves 55 on the key cylinder 50 to the ends of the circumferential grooves 54. The key cylinder 50 in this state is then rotated relative to the rotary cylinder 40. This allows the engagement tabs 44 on the rotary cylinder 40 to be engaged with the corresponding circumferential grooves 54 on the key cylinder 50.

As shown in FIG. 8, the cylindrical portion 51 of the key cylinder 50 includes screw receivers 51A along its rear end. The connecting frame 60 is a component for attaching the rear light shield 110 and a front light shield 120 to the rear end of the key cylinder 50. The connecting frame 60 has threaded holes 61. The threaded holes 61 in the connecting frame 60 receive screws (not shown). The screws are screwed into the screw receivers 51A in the key cylinder 50 to fasten the connecting frame 60 to the rear end of the key cylinder 50.

The connecting frame 60 includes two engagement members 62 extending radially outward. Each engagement member 62 has a width slightly smaller than the width of the corresponding axial groove 16 on the stationary cylinder 10. Each engagement member 62 is thus engaged with and movable in the axial direction inside the corresponding axial groove 16 on the stationary cylinder 10. The key cylinder 50 thus does not rotate relative to the stationary cylinder 10, but can move in the axial direction together with the rotary cylinder 40 while rotating relative to the rotary cylinder 40.

Figure 9:
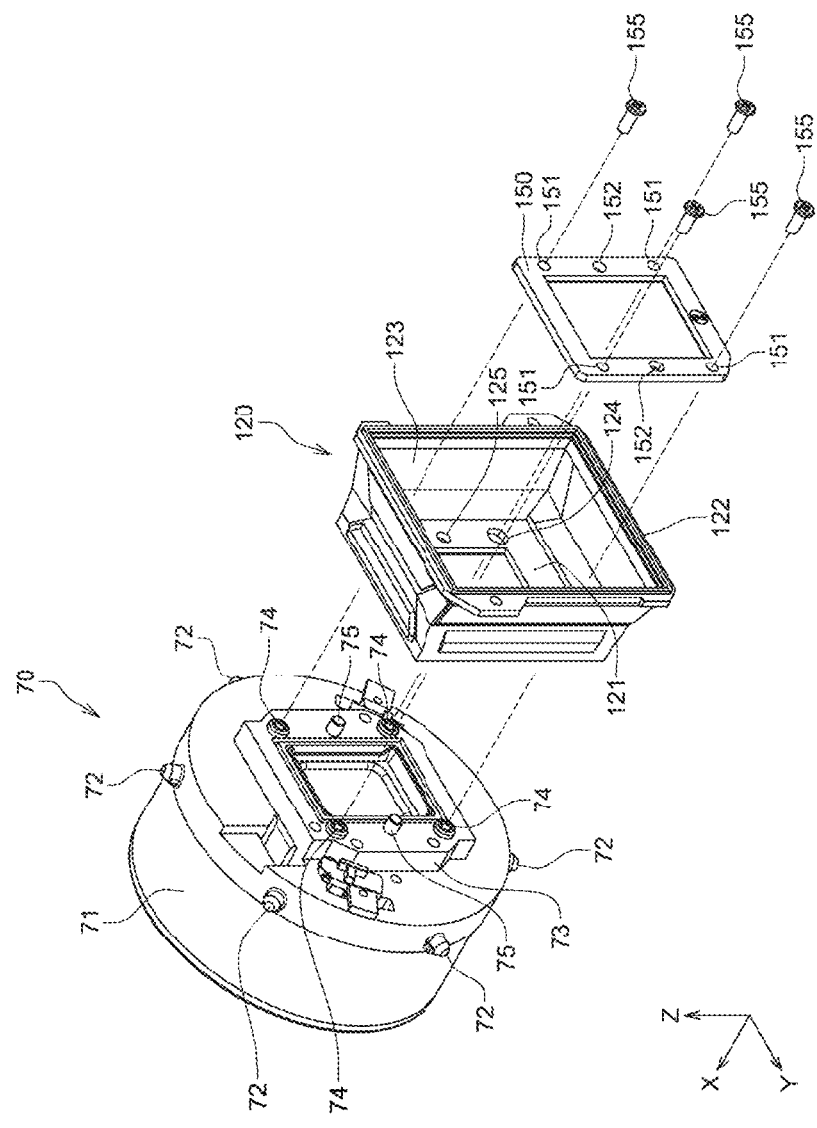
FIG. 9 is an exploded perspective view of a linearly movable cylinder in the lens barrel in the camera in FIG. 1, also showing a front light shield attached to the rear end of the linearly movable cylinder.

Ha 9 is an exploded perspective view of the linearly movable cylinder 70, also showing the front light shield 120 attached to its rear end. As shown in FIGS. 3 and 9, the linearly movable cylinder 70 includes a cylindrical portion 71 (fourth cylindrical portion) located radially inward from the key cylinder 50 and six cylindrical actuation portions 72 (second actuation portions) protruding radially outward from its outer circumferential surface. The actuation portions 72 are located at equal intervals in the circumferential direction. Each actuation portion 72 has an outer diameter slightly smaller than the circumferential widths of the corresponding axial groove 52 and the corresponding connecting groove 53 on the key cylinder 50 and the circumferential widths of the corresponding connecting groove 46 and the corresponding cam groove 45 on the rotary cylinder 40. Each actuation portion 72 is thus engaged with the corresponding cam groove 45 on the rotary cylinder 40 through the corresponding axial groove 52 in the key cylinder 50.

The key cylinder 50 does not rotate relative to the stationary cylinder 10 with the engagement between the engagement members 62 in the connecting frame 60 and the axial grooves 16 on the stationary cylinder 10. In contrast, the rotary cylinder 40 is rotatable relative to the stationary cylinder 10. Thus, when the rotary cylinder 40 rotates relative to the stationary cylinder 10, the linearly movable cylinder 70 with its actuation portions 72 engaged with the corresponding cam grooves 45 on the rotary cylinder 40 moves in X-direction relative to the rotary cylinder 40 along the shape of the cam grooves 45, In this manner, the linearly movable cylinder 70 cart extend in the positive X-direction from the rotary cylinder 40 as the rotary cylinder 40 rotates relative to the stationary cylinder 10.

To join the linearly movable cylinder 70 to the key cylinder 50, the rotary cylinder 40 is rotated relative to the key cylinder 50 to align the connecting grooves 46 on the rotary cylinder 40 with the corresponding connecting grooves 53 on the key cylinder 50 in the circumferential direction after the key cylinder 50 is joined to the rotary cylinder 40 in the manner described above. The linearly movable cylinder 70 is then moved in the negative X-direction from the fronts of the rotary cylinder 40 and the key cylinder 50 with the actuation portions 72 of the linearly movable cylinder 70 aligned with the corresponding connecting grooves 53 and 46 in the circumferential direction. This allows the actuation portions 72 of the linearly movable cylinder 70 to move from the corresponding connecting grooves 53 into the corresponding axial grooves 52 in the key cylinder 50 as well as from the corresponding connecting grooves 46 into the corresponding cam grooves 45 on the rotary cylinder 40. This allows the actuation portions 72 of the linearly movable cylinder 70 to be engaged with the corresponding axial grooves 52 in the key cylinder 50 and with the corresponding cam grooves 45 on the rotary cylinder 40.

In the present embodiment, as described above, the key cylinder 50 has the connecting grooves 53 on its front edge to guide the actuation portions 72 of the linearly movable cylinder 70 into the corresponding axial grooves 52 in the key cylinder 50, and the rotary cylinder 40 has the connecting grooves 46 on its front edge to guide the actuation portions 72 of the linearly movable cylinder 70 into the corresponding cam grooves 45 on the rotary cylinder 40. For the appearance of the product, the connecting grooves 53 and 46 are not to be exposed outside. The cover ring 58 is thus attached to the key cylinder 50 to cover the front edges of the key cylinder 50 and the rotary cylinder 40. For example, the cover ring 58 can be attached to the key cylinder 50 by fitting a projection 58A (refer to FIG. 3) on the rear surface of the cover ring 58 into one of the connecting grooves 53 on the key cylinder 50.

Figure 10A:
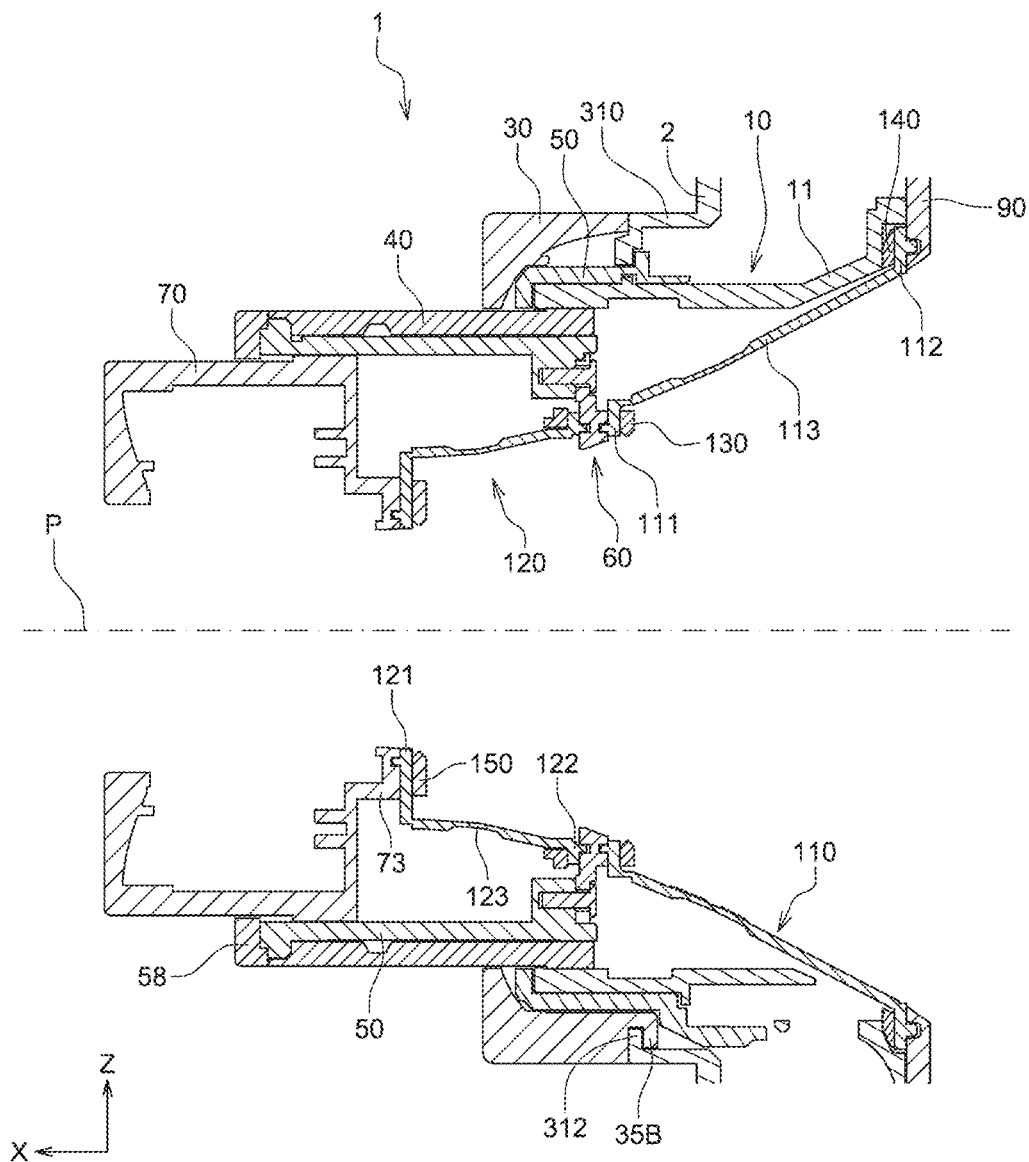
FIG. 10A is a longitudinal sectional view of the camera in FIG. 1 in a most extended state.
Figure 10B:
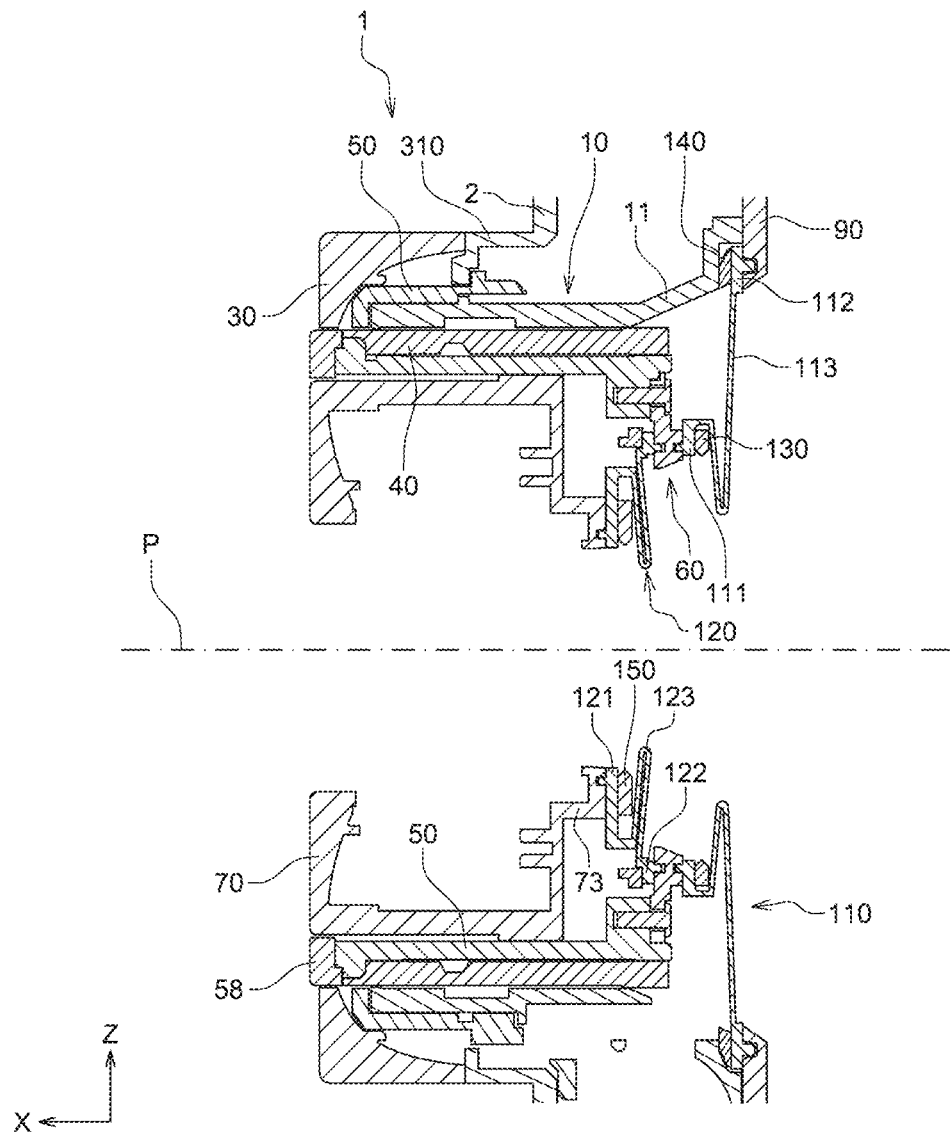
FIG. 10B is a longitudinal sectional view of the camera in FIG. 1 in a retracted state.

FIG. 10A is a longitudinal sectional view of the camera 1 in the most extended state. FIG. 10B is a longitudinal sectional view of the camera 1 in the retracted state. As shown in FIGS. 10A and 10B, the camera 1 according to the present embodiment includes the rear light shield 110 (first light shield) and the front light shield 120 (second light shield) that block light outside the lens barrel 4 entering an optical path in the lens barrel 4. The rear light shield 110 is located between the rear end of the key cylinder 50 and the frame 90. The rear light shield 110 is formed from a flexible material such as rubber and expands and contracts as the key cylinder 50 (rotary cylinder 40) moves in the axial direction relative to the stationary cylinder 10. The front light shield 120 is located between a rear end 73 of the linearly movable cylinder 70 and the mar end of the key cylinder 50. Similarly to the rear light shield 110, the front light shield 120 is formed from a flexible material such as rubber and expands and contracts as the linearly movable cylinder 70 moves in the axial direction relative to the key cylinder 50 (rotary cylinder 40).

Referring back to FIG. 8, the rear light shield 110 includes a front connector 111 being a rectangular frame fastened to the rear end of the key cylinder 50, a rear connector 112 being a rectangular frame secured to the frame 90, and a bellows 113 (first bellows) connecting the front connector 111 and the rear connector 112 in an expandable manner. The rear light shield 110 has a rectangular opening inside. This opening inside the rear light shield 110 gradually enlarges from the front connector 111 toward the rear connector 112.

As shown in FIG. 8, the front connector 111 in the rear light shield 110 has multiple threaded holes 114. The connecting frame 60, which is attached to the key cylinder 50, has threaded holes 63 corresponding to the threaded holes 114 in the front connector 111 in the rear light shield 110. An attachment plate 130 being a rectangular frame is located behind the front connector 111 in the rear light shield 110 (in the negative X-direction). The attachment plate 130 also has threaded holes 131 corresponding to the threaded holes 114 in the front connector 111 in the rear light shield 110. Screws 135 are screwed into the threaded holes 131 in the attachment plate 130, the threaded holes 114 in the front connector 111 in the rear light shield 110, and the threaded holes 63 in the connecting frame 60 attached to the key cylinder 50 to hold the front connector 111 in the rear light shield 110 between the attachment plate 130 and the connecting frame 60 attached to the key cylinder 50.

The rear light shield 110 and the attachment plate 130 are positioned with respect to the connecting frame 60 by placing projections 64 on the connecting frame 60 into positioning holes 115 in the front connector 111 in the rear light shield 110 and positioning holes 132 in the attachment plate 130.

Figure 11:
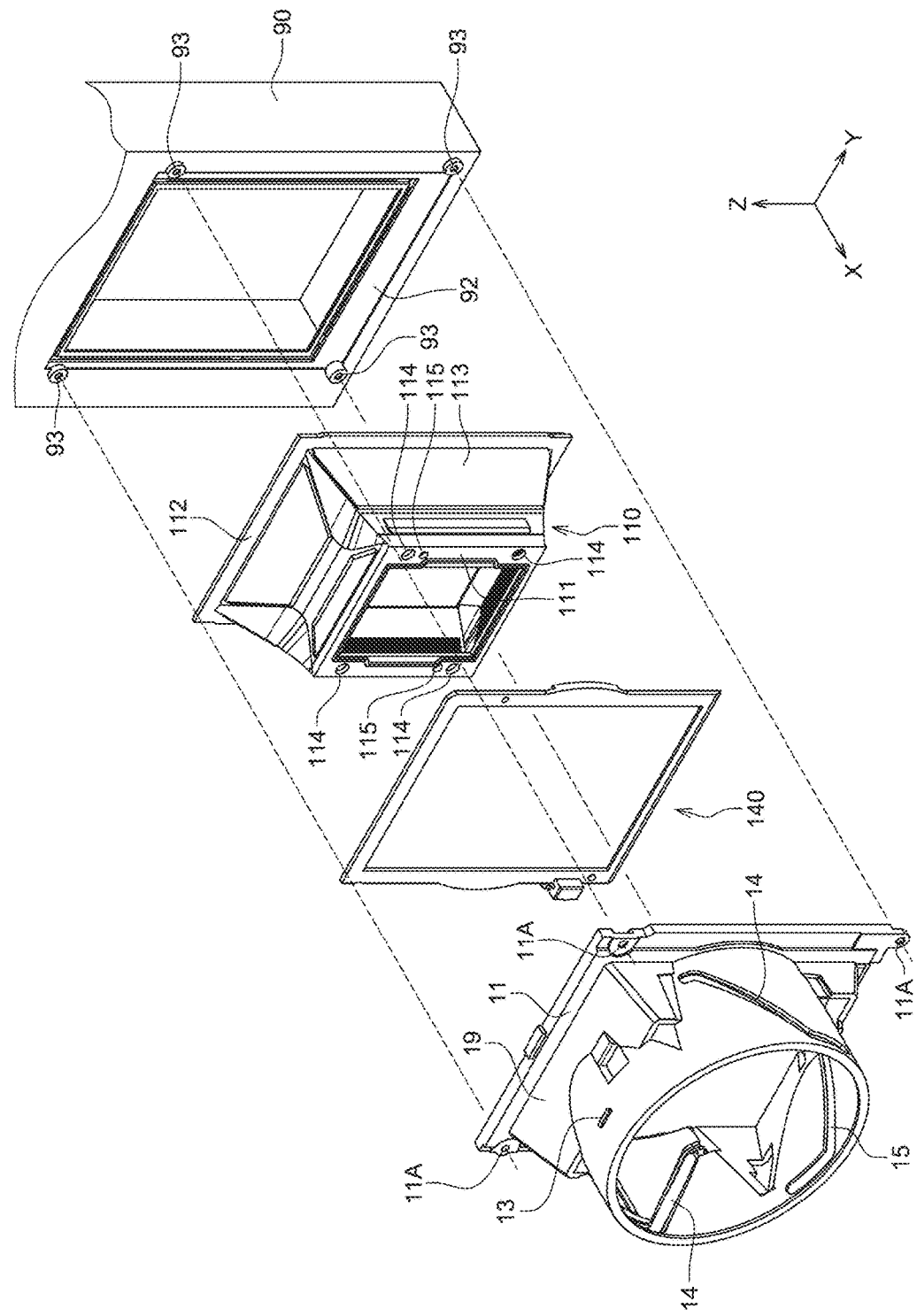
FIG. 11 is an exploded perspective view describing attachment of the rear light shield shown in FIG. 8 to a frame.

FIG. 11 is an exploded perspective view describing attachment of the rear light shield 110 to the frame 90. As shown in FIG. 11, the frame 90 has a rectangular recess 92 for receiving the rear connector 112 in the rear light shield 110. The recess 92 has a rectangular opening inside. A pressure plate 140 is located between the rear connector 112 in the rear light shield 110 and the base 11 in the stationary cylinder 10. The pressure plate 140 presses the rear light shield 110 against the frame 90 to secure the rear light shield 110 to the frame 90. As described above, the stationary cylinder 10 is fastened to the frame 90 with the screws 91 (refer to FIG. 2) received in the threaded holes 11A in the base 11 in the stationary cylinder 10 and screwed into threaded holes 93 in the frame 90. With the stationary cylinder 10 fastened to the frame 90 in this manner, the base 11 in the stationary cylinder 10 presses the pressure plate 140 in the negative X-direction. This causes the rear connector 112 in the rear light shield 110 to be held between the pressure plate 140 and the frame 90.

Referring to FIG. 9, the front light shield 120 includes a front connector 121 being a rectangular frame fastened to the rear end 73 of the linearly movable cylinder 70, a rear connector 122 being a rectangular frame fastened to the connecting frame 60 attached to the key cylinder 50, and a bellows 123 (second bellows) connecting the front connector 121 and the rear connector 12 in a expandable manner. The front light shield 120 has a rectangular opening inside. This opening inside the front light shield 120 gradually enlarges from the front connector 121 toward the rear connector 122.

As shown in FIG. 9, the front connector 121 in the front light shield 120 has multiple threaded holes 124. The rear end 73 of the linearly movable cylinder 70 has threaded holes 74 corresponding to the threaded holes 124 in the front connector 121 in the front light shield 120. An attachment plate 150 being a rectangular frame is located behind the front connector 121 in the front light shield 120 (in the negative X-direction). The attachment plate 150 also has threaded holes 151 corresponding to the threaded holes 124 in the front connector 121 in the front light shield 120. Screws 155 are screwed into the threaded holes 151 in the attachment plate 150, the threaded holes 124 in the front connector 121 in the front light shield 120, and the threaded holes 74 in the rear end 73 of the linearly movable cylinder 70 to hold the front connector 121 in the front light shield 120 between the attachment plate 150 and the rear end 73 of the linearly movable cylinder 70.

The front light shield 120 and the attachment plate 150 are positioned with respect to the linearly movable cylinder 70 by placing projections 75 on the rear end 73 of the linearly movable cylinder 70 into positioning holes 125 in the front connector 121 in the front light shield 120 and positioning holes 152 in the attachment plate 150.

Figure 12:
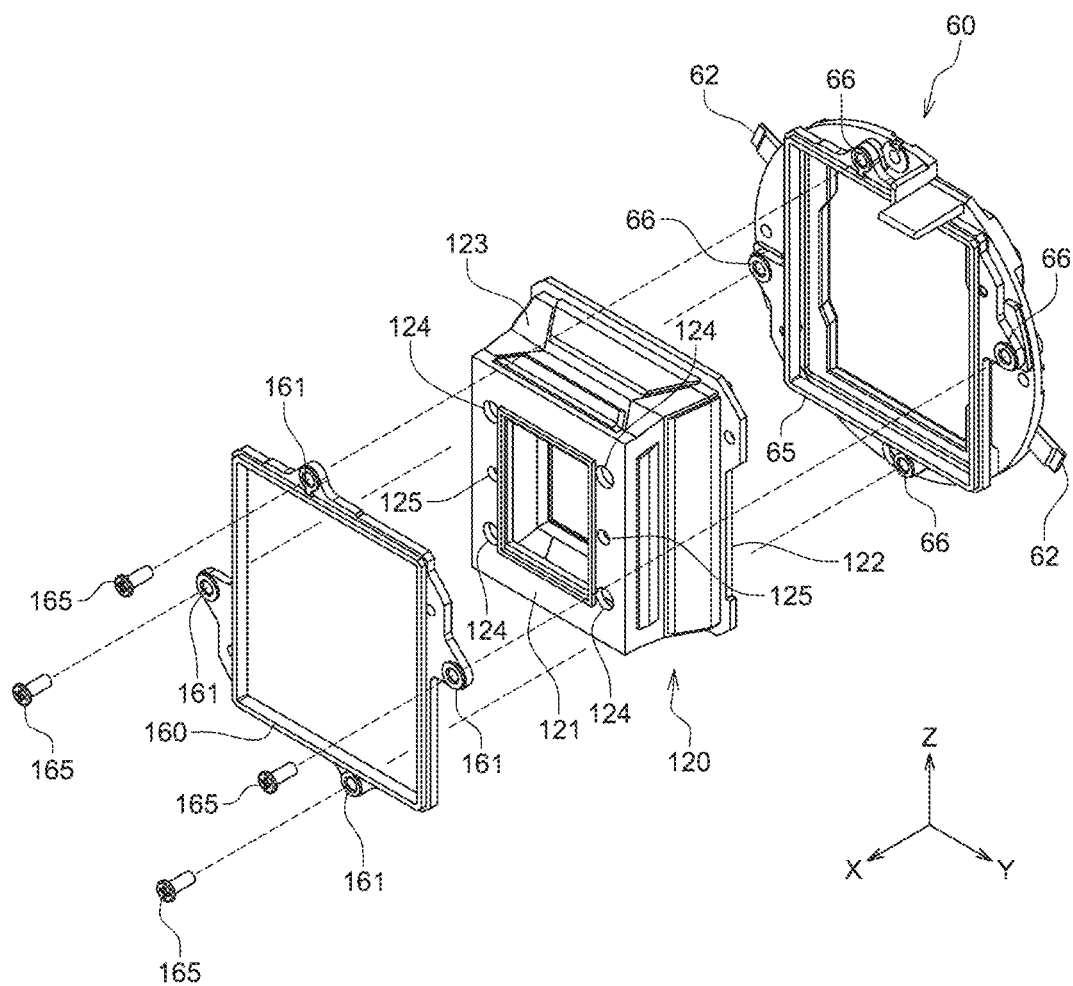
FIG. 12 is an exploded perspective view describing attachment of the front light shield shown in FIG. 9 to the connecting frame.

FIG. 12 is an exploded perspective view describing attachment of the front light shield 120 to the connecting frame 60. As shown in FIG. 12, the connecting frame 60 includes a frame 65 for receiving the rear connector 122 in the front light shield 120. An attachment plate 160 being a rectangular frame is located in front of the rear connector 122 in the front light shield 120 (in the positive X-direction). The attachment plate 160 has multiple threaded holes 161. The connecting frame 60 has threaded holes 66 corresponding to the threaded holes 161 in the attachment plate 160. Screws 165 are screwed into the threaded holes 161 in the attachment plate 160 and the threaded holes 66 in the connecting frame 60 to hold the rear connector 122 in the front light shield 120 between the attachment plate 160 and the connecting frame 60.

In the above embodiment, when the user rotates the cylindrical portion 31 of the cover cylinder 30 relative to the stationary cylinder 10 in the retracted state of the camera 1 shown in FIG. 1, the drive cylinder 20 rotates integrally with the cover cylinder 30. This causes the rotary cylinder 40 with its actuation portions 42 engaged with the corresponding axial grooves 24 on the drive cylinder 20 as well as with the corresponding through-cam grooves 14 in the stationary cylinder 10 to rotate integrally with the drive cylinder 20 and also to move in the axial direction along the shape of the through-cam grooves 14 in the stationary cylinder 10. This causes the linearly movable cylinder 70 with its actuation portions 72 engaged with the corresponding axial grooves 52 in the key cylinder 50 as well as with the corresponding cam grooves 45 on the rotary cylinder 40 to move in the axial direction along the shape of the cam grooves 45 on the rotary cylinder 40 without rotating relative to the stationary cylinder 10. In this manner, both the rotary cylinder 40 and the linearly movable cylinder 70 in the lens barrel 4 can be extended in the axial direction. In the retracted state and the most extended state, each extending portion 22 of the drive cylinder 20 is in contact with an edge 19A of the corresponding mount 19 on the base 11 in the stationary cylinder 10 (refer to FIGS. 3 and 5A), thus restricting further rotation of the drive cylinder 20.

The connecting frame 60 is attached to the rear end of the key cylinder 50 that extends in the axial direction together with the rotary cylinder 40, and the expandable bellows 113 in the rear light shield 110 connects the connecting frame 60 and the frame 90. This structure blocks light outside the lens barrel 4 entering the optical path between the rear end of the key cylinder 50 and the frame 90. The expandable bellows 123 in the front light shield 120 connects the rear end 73 of the linearly movable cylinder 70 and the connecting frame 60. This structure blocks light outside the lens barrel 4 entering the optical path between the rear end 73 of the linearly movable cylinder 70 and the rear end of the key cylinder 50.

As described above, a camera according to one aspect of the present invention blocks light outside a lens barrel entering an optical path in the lens barrel. The camera includes a housing having a front surface with an opening, a frame accommodated in the housing, and a lens barrel accommodating at least one lens. The lens barrel includes a stationary cylinder including a base fastened to the frame and a cylindrical wall having a through-cans groove extending with a circumferential position of the through-cam groove changing in an axial direction, a drive cylinder that drives the lens barrel to extend and retract, a rotary cylinder rotatable relative to the stationary cylinder and movable in the axial direction, a key cylinder movable in the axial direction together with the rotary cylinder without rotating relative to the stationary cylinder, and a linearly movable cylinder rotatable relative to the rotary cylinder together with the key cylinder. The drive cylinder is rotatable relative to the stationary cylinder without moving in the axial direction. The camera includes a connecting frame attached to a rear end of the key cylinder in the lens barrel and a first light shield including a first bellows connecting the connecting frame and the frame in an expandable manner. The rotary cylinder includes a first cylindrical portion located radially inward from the cylindrical wall of the stationary cylinder, and a first actuation portion protruding radially outward from the first cylindrical portion and engaged with the through-cam groove in the stationary cylinder. The drive cylinder includes a second cylindrical portion located radially outward from the cylindrical wall of the stationary cylinder. The second cylindrical portion has a first axial groove extending in the axial direction and engaged with the first actuation portion of the rotary cylinder protruding radially outward through the through-cam groove in the stationary cylinder. The first cylindrical portion of the rotary cylinder has, on an inner circumferential surface of the first cylindrical portion, a first cam groove extending with a circumferential position of the first cam groove changing in the axial direction. The key cylinder includes a third cylindrical portion located radially inward from the first cylindrical portion of the rotary cylinder. The third cylindrical portion has a second axial groove extending in the axial direction. The linearly movable cylinder includes a fourth cylindrical portion located radially inward from the first cylindrical portion of the rotary cylinder, and a second actuation portion protruding radially outward from the fourth cylindrical portion and engaged with the first cam groove on the rotary cylinder through the third cylindrical portion of the key cylinder.

In this structure, when the drive cylinder is rotated relative to the stationary cylinder, the rotary cylinder with its first actuation portion engaged with the first axial groove on the drive cylinder as well as with the through-cam groove in the stationary cylinder rotates integrally with the drive cylinder and also moves in the axial direction along the shape of the through-cam groove in the stationary cylinder. This causes the linearly movable cylinder with its second actuation portion engaged with the second axial groove in the key cylinder as well as with the first cam groove on the rotary cylinder to move in the axial direction along the shape of the first cam groove on the rotary cylinder without rotating relative to the stationary cylinder. In this manner, both the rotary cylinder and the linearly movable cylinder in the lens barrel can be extended in the axial direction.

The connecting frame is attached to the rear end of the key cylinder that extends in the axial direction together with the rotary cylinder, and the expandable first bellows in the first light shield connects the connecting frame and the frame. This structure blocks light outside the lens barrel entering the optical path between the rear end of the key cylinder and the frame.

The camera may further include a second light shield including a second bellows connecting a rear end of the linearly movable cylinder and the connecting frame in an expandable manner. In this case, the expandable second bellows in the second light shield connects the rear end of the linearly movable cylinder and the connecting frame. This structure blocks light outside the lens barrel entering the optical path between the rear end of the linearly movable cylinder and the rear end of the key cylinder.

The cylindrical wall of the stationary cylinder may have, on an inner circumferential surface of the cylindrical wall, a third axial groove extending in the axial direction. In this case, the connecting frame may include an engagement member engaged with the third axial groove on the cylindrical wall of the stationary cylinder. This structure uses the engagement member of the connecting frame engaged with the third axial groove on the cylindrical wall of the stationary cylinder to allow the key cylinder with the connecting frame to move in the axial direction without rotating relative to the stationary cylinder.

The cylindrical wall of the stationary cylinder may have, on an inner circumferential surface of the cylindrical wall, a second cam groove extending in a shape corresponding to the through-cam groove. In this case, the rotary cylinder may further include a protrusion protruding radially outward from the first cylindrical portion and engaged with the second cane groove on the stationary cylinder. In this structure, the protrusion on the rotary cylinder and the second cam groove on the stationary cylinder engaged with each other supplementarily support the rotary cylinder inside the stationary cylinder.

The first cylindrical portion of the rotary cylinder may have a first connecting groove extending in the axial direction from a front edge of the rotary cylinder and connecting to an end of the first cam groove. The third cylindrical portion of the key cylinder may have a second connecting groove extending in the axial direction from a front edge of the key cylinder and connecting to an end of the second axial groove. This structure allows the second actuation portion of the linearly movable cylinder to move from the second connecting groove on the third cylindrical portion of the key cylinder into the second axial groove in the key cylinder as well as from the first connecting groove on the first cylindrical portion of the rotary cylinder into the first cam groove on the rotary cylinder. This allows the second actuation portion of the linearly movable cylinder to be engaged with the second axial groove in the key cylinder and the first cam groove on the rotary cylinder.

In this case, to prevent the second connecting groove on the third cylindrical portion of the key cylinder and the first connecting groove on the first cylindrical portion of the rotary cylinder from being exposed outside, a cover ring may be placed to cover the front edge of the rotary cylinder and the front edge of the key cylinder.

Although the embodiments of the present invention have been described above, the present invention is not limited to the above embodiments and may be modified variously within the scope of its technical idea.

What is claimed is:

1. A camera, comprising:
   a housing having a front surface with an opening;
   a frame accommodated in the housing;
   a lens barrel accommodating at least one lens, the lens barrel including
       a stationary cylinder including a base fastened frame and a cylindrical wall having a through-cam groove, the through-cam groove extending a circumferential position of the through-cam groove changing in an axial direction,
       a drive cylinder configured to drive the lens barrel to extend and retract, the drive cylinder being rotatable relative to the stationary cylinder without moving in the axial direction,
       a rotary cylinder rotatable relative to the stationary cylinder and movable in the axial direction,
       a key cylinder movable in the axial direction together with the rotary cylinder without rotating relative to the stationary cylinder, and
       a linearly movable cylinder rotatable relative to the rotary cylinder together with the key cylinder;
   a connecting frame attached to a rear end of the key cylinder in the lens barrel; and
   a first light shield including a first bellows connecting the connecting frame and the frame in an expandable manner,
   wherein the rotary cylinder includes
       a first cylindrical portion located radially inward from the cylindrical wall of the stationary cylinder, and
       a first actuation portion protruding radially outward from the first cylindrical portion and engaged with the through-cam groove in the stationary cylinder,
   the drive cylinder includes a second cylindrical portion located radially outward from the cylindrical wall of the stationary cylinder, the second cylindrical portion has a first axial groove extending in the axial direction and engaged with the first actuation portion of the rotary cylinder protruding radially outward through the through-cam groove in the stationary cylinder,
   the first cylindrical portion of the rotary cylinder has, on an inner circumferential surface of the first cylindrical portion, a first cam groove extending with a circumferential position of the first cam groove changing in the axial direction,
   the key cylinder includes a third cylindrical portion located radially inward from the first cylindrical portion of the rotary cylinder, the third cylindrical portion has a second axial groove extending in the axial direction, and the linearly movable cylinder includes
- a fourth cylindrical portion located radially inward from the first cylindrical portion of the rotary cylinder, and
- a second actuation portion protruding radially outward from the fourth cylindrical portion and engaged with the first cam groove on the rotary cylinder through the third cylindrical portion of the key cylinder.

2. The camera according to claim 1, further comprising:
a second light shield including a second bellows connecting a rear end of the linearly movable cylinder and the connecting frame in an expandable manner.

3. The camera according to claim 1, wherein
the cylindrical wall of the stationary cylinder has, on an inner circumferential surface of the cylindrical wall, a third axial groove extending in the axial direction, and
the connecting frame includes an engagement member engaged with the third axial groove on the cylindrical wall of the stationary cylinder.

4. The camera according to claim 1, wherein
the cylindrical wall of the stationary cylinder has, on an inner circumferential surface of the cylindrical wall, a second cam groove extending in a shape corresponding to the through-cam groove, and
the rotary cylinder further includes a protrusion protruding radially outward from the first cylindrical portion and engaged with the second cam groove on the stationary cylinder.

5. The camera according to claim 1, wherein
the first cylindrical portion of the rotary cylinder has a first connecting groove extending in the axial direction from a front edge of the rotary cylinder and connecting to an end of first cam groove, and
the third cylindrical portion of the key cylinder has a second connecting groove extending in the axial direction from a front edge of the key cylinder and connecting to an end of the second axial groove.

6. The camera according to claim 5, wherein
the leans barrel further includes a cover ring covering the front edge of the rotary cylinder and the front edge of the key cylinder.

* * * * *